US007212250B1

(12) United States Patent
Neal

(10) Patent No.: US 7,212,250 B1
(45) Date of Patent: May 1, 2007

(54) METHOD AND APPARATUS FOR PROVIDING ON-SCREEN DISPLAYS FOR A MULTI-COLORIMETRY RECEIVER

(75) Inventor: Charles Bailey Neal, Zionsville, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 525 days.

(21) Appl. No.: 10/030,834

(22) PCT Filed: Jun. 26, 2000

(86) PCT No.: PCT/US00/17477

§ 371 (c)(1),
(2), (4) Date: Jan. 10, 2002

(87) PCT Pub. No.: WO01/06797

PCT Pub. Date: Jan. 25, 2001

Related U.S. Application Data

(60) Provisional application No. 60/144,151, filed on Jul. 15, 1999.

(51) Int. Cl.
 H04N 5/445 (2006.01)
(52) U.S. Cl. .................... 348/569; 348/659; 348/555; 348/557
(58) Field of Classification Search ............ 348/569, 348/659, 600, 661, 554–558, 563, 564, 565, 348/640, 660; H04N 5/445
See application file for complete search history.

(56) References Cited

U.S. PATENT DOCUMENTS

| 5,912,710 | A | * | 6/1999 | Fujimoto | ................ 348/445 |
| 5,969,770 | A | * | 10/1999 | Horton | .................. 348/569 |
| 5,990,982 | A | * | 11/1999 | Gove et al. | ............... 348/750 |
| 6,208,350 | B1 | * | 3/2001 | Herrera | .................. 345/582 |
| 6,421,094 | B1 | * | 7/2002 | Han | ....................... 348/569 |
| 6,542,162 | B1 | * | 4/2003 | Hrusecky et al. | ........ 345/629 |
| 6,570,626 | B1 | * | 5/2003 | Mendenhall et al. | .... 348/569 |

FOREIGN PATENT DOCUMENTS

| EP | 0833506 | | 4/1998 |
| JP | 403268594 | A * | 11/1991 |
| JP | 10-304272 | | 11/1998 |
| WO | 97/10678 | | 3/1997 |

OTHER PUBLICATIONS

Patent Abstracts of Japan, vol. 1999, No. 02, Feb. 26, 1999 and JP 10-304272.

* cited by examiner

*Primary Examiner*—Trang U. Tran
(74) *Attorney, Agent, or Firm*—Joseph J. Laks; Robert D. Shedd; Paul P. Kiel

(57) ABSTRACT

An apparatus and a method for adjusting the colors of the on-screen display graphics to match the colors of the video with which the OSD graphics are to be combined. In one aspect, a selected one of a plurality of OSD color palettes (103, 105) is used to produce graphics for a selected one of a plurality of signal sources. As such, the appropriately formatted palette is used to produce graphics for a similarly formatted input signal, i.e., an analog source would be combined with graphics produced from a palette having Y, $P_I$, $P_Q$ formatted signals. Consequently, the color compensation matrices would properly compensate both the graphics and the video from each source. In another aspect, a desired one of a plurality of matrices (107, 109) operates on the OSD signal source to match the OSD colorimetry with the input signal colorimetry.

8 Claims, 3 Drawing Sheets

METHOD AND APPARATUS FOR PROVIDING ON-SCREEN DISPLAYS FOR A MULTI-COLORIMETRY RECEIVER

This application claims the benefit under 35 U.S.C. § 365 of International Application PCT/US00//17477, filed Jun. 26, 2000, which was published in accordance with PCT Article 21(2) on Jan. 25, 2001 in English; and which claims benefit of U.S. provisional application Ser. No. 60/144,151 filed Jul. 15, 1999.

BACKGROUND OF THE INVENTION

1) Field of the Invention

The invention relates to an apparatus and a method for processing video signals, and more particularly, to an apparatus and a method for processing on screen display (OSD) signals and video signals from various sources having different colorimetries.

2) Description of the Related Art

Modern television receivers are designed to receive and process video signals from various sources, for example, analog television signals from a National Television Standards Committee (NTSC) transmission or a video tape, as well as digital video signals transmitted in accordance with the ATSC Digital Television Standard, A/54 (1995). Different signal sources may be encoded according to different colorimetries. "Colorimetry" refers to the combination of color primaries, transfer characteristics, and matrix coefficients associated with generating and processing color representative signals. For example, NTSC signals comply with SMPTE 170M colorimetry and ATSC signals default to comply with ITU-R BT.709 (1990) colorimetry. Additionally, ISO/IEC 13818-2 provides for the broadcaster to specify the input colorimetry to the receiver to allow for other colorimetry combinations.

In view of the possible differences in colorimetries between different signals, it is desirable to design television receiver circuitry with colorimetry compensation so that the video display of the signals from the various sources has a uniform colorimetry. Such circuitry compensates the input video signals such that the color of similar objects are substantially similar regardless of the particular colorimetry. For example, a flesh tone from an ATSC source should appear similar to a flesh tone from an NTSC source.

Television receivers also produce and display OSD graphics that provide information and enable user interface functions. Typically, the OSDs are generated in response to user input to provide information about a program or the receiver, and to allow the user to control functions such as channel selection, image quality and the like. An OSD system usually comprises a common source of OSD signals, which signals are generated by a processing unit in response to received signals or user input, stored in a memory, and then read out and combined with the received video signals. The signals are combined after colorimetry compensation has been performed on the video signal. The OSD signals are combined with the video signals in a mixer that is controlled by a microprocessor. As the lines of the image are traced on a CRT, or a similar display device, the microprocessor selects either the OSD signal or the video signal for output in response to an output of a counter, thereby selectively inserting the OSD image onto the video program image.

BRIEF SUMMARY OF THE INVENTION

However, it may be desirable to couple the OSD signal to the video signal prior to the colorimetry compensation. Coupling the signals prior to the colorimetry compensation can reduce memory requirements and reduce processing delays. In this regard, OSD colors may change when colorimetry compensation is applied to a combined signal that includes video program and OSD signals. As such, the OSD graphics colorimetry may change substantially from one video source to another. Therefore, it is also desirable to couple the OSD signal to the video signal prior to the colorimetry compensation in a manner that provides uniform color output of the OSD image regardless of the signal source.

The present invention provides a method and apparatus for coupling an OSD signal with a video program signal prior to colorimetry compensation. In particular, the present invention provides a method and apparatus for coupling an OSD signal with a video program signal prior to colorimetry compensation in a manner that the displayed OSD colors are uniform regardless of the signal source.

In one aspect, the present invention comprises an OSD unit having an OSD palette, which OSD unit is coupled to a display processor. The output of the display processor is coupled to one of a plurality of matrices to provide colorimetry compensation. The output of the selected matrix is coupled to a display unit, for example a CRT, a flat panel display or the like, for providing an output image.

In another aspect, the present invention comprises an OSD unit having a plurality of OSD palettes, each one of the plurality of OSD palettes having OSD data stored in a particular colorimetry format and being associated with a particular one of a plurality of signal sources. A display processor is coupled, via a switch, to a selected one of the OSD palettes in response to the selection of a particular signal source. In this manner, the colorimetry of the OSD signal matches the colorimetry of the video program signal from the signal source. The output of the display processor is coupled to one of a plurality of matrices to provide colorimetry compensation. The output of the selected matrix is coupled to a display unit.

In another aspect, the present invention comprises an OSD unit having an OSD palette, and a plurality of OSD matrices, each one of the plurality of OSD matrices adapted to provide a particular colorimetry compensation and being associated with a particular one of a plurality of signal sources. The OSD palette is coupled to a selected one of the OSD matrices in response to the selection of a particular signal source. In this manner, the colorimetry of the OSD signal is adjusted to match the colorimetry of the video program signal from the selected signal source. The output of the selected OSD matrix is coupled to a display processor, wherein the OSD signal is combined with a video program signal. The output of the display processor is then coupled, via a switch, to a selected one of a plurality of matrices to provide colorimetry compensation. The output of the selected matrix is coupled to a display unit.

Therefore, in accordance with the present invention, the colorimetry of the OSD signal is matched to the colorimetry of the video signal, and the OSD signal is coupled to the video program signal prior to the matrix operation of the combined signal thereby providing uniform OSD colors at the display regardless of the signal source.

BRIEF DESCRIPTION OF THE DRAWINGS

The teachings of the present invention are described with reference to the accompanying drawings, wherein.

Figure 1:
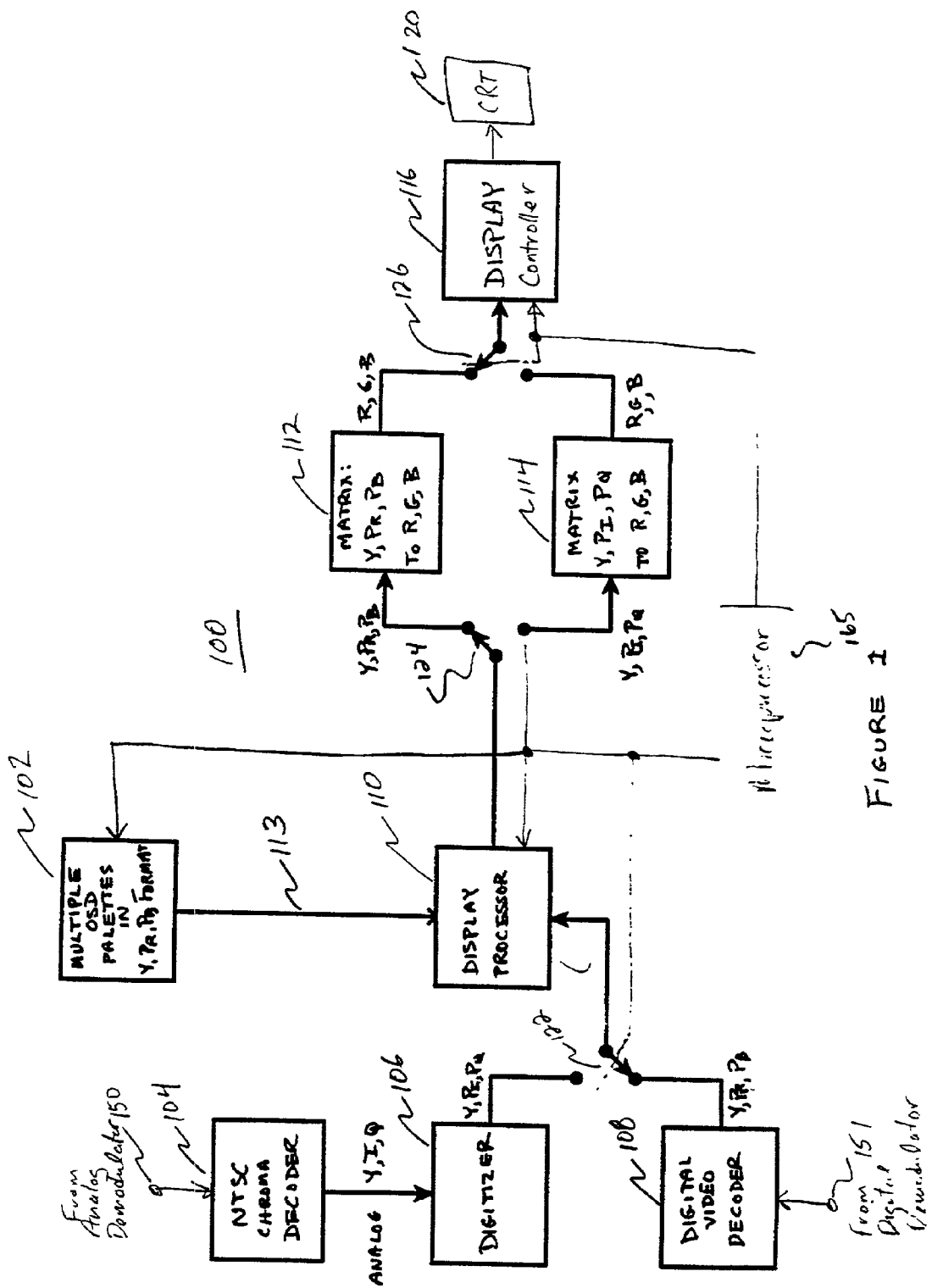
FIG. 1 illustrates a block diagram of an OSD system wherein the OSD signal is coupled to the video signal prior to the colorimetry compensation.

To facilitate understanding, common reference numerals have been used to designate elements that are common to the figures.

DETAILED DESCRIPTION OF THE INVENTION

FIG. 1 depicts a simplified block diagram of a video signal processing apparatus 100 in accordance with the present invention. The construction of the elements of apparatus 100 are known to those skilled in the art and will not be discussed in detail here.

Apparatus 100 comprises NTSC chroma decoder 104, which receives an NTSC signal via input 150. The NTSC signal is received and demodulated and coupled to chroma decoder 104 in the conventionally known manner. Chroma decoder 104 provides a luminance signal Y and two color difference signals I and Q. The color difference signals I and Q comprise R-Y and B-Y components of different magnitude and represent signals on quadrature axes rotated 33 degrees counterclockwise from the R-Y, B-Y axes.

The analog output signal Y, I, and Q are applied to digitizer 106 that provides digital representations of the signals, designated Y, $P_I$ and $P_Q$. The digital representations are coupled to a first terminal of switch 122. Switch 122, as well as the various other switches illustrated in the figures that couple the various program or OSD signals to the respective processors or matrices, is controlled by microprocessor 165, which controls the overall operation of the apparatus. Microprocessor 165 may comprise any one of a plurality of control devices known to those skilled in the art for controlling the various elements of the apparatus. Also, although the present invention describes a single microprocessor, those skilled in the art will realize that microprocessor 165 may comprise various dedicated devices to control specific functions, i.e., a memory controller, a microprocessor interface unit, and the like.

Digital video signals are coupled to digital video decoder 108 via input 151. Digital video decoder provides output signals Y, $P_R$ and $P_B$, which are coupled to a second input of switch 122. The color difference signals $P_R$ and $P_B$ comprise R-Y and B-Y signals that are modified by scale factors. The output of switch 122 is coupled to display processor 110, which includes a buffer memory for holding video data and/or combined video and OSD data to be read out. The read out of the video data stored in display processor 110 is controlled by microprocessor 165.

The OSD signals are generated using OSD palette 102, which includes representations of the OSD signals in Y, $P_R$, and $P_B$ format. OSD palette 102 may be embodied in software form, wherein a particular sequence of bits is associated with a particular color. Based on the color information in OSD palette 102, microprocessor 165 generates an OSD bitstream and transfers the generated OSD bitstream to display processor 110. The generated OSD bitstream is combined with the video program signal based on the desired location of the OSD image on the output image. Thus, the memory of display processor 110 includes a bit mapped representation of the output signal, which includes the video program image combined with the OSD image.

When it is desired to display the bit mapped image stored in display processor 110, the stored bitstream corresponding to the image is read out to either one of the matrices 112 or 114 via switch 124. Microprocessor 165 controls switch 124 to couple the output of display processor 110 to the input of matrix 114 if the input signal is an analog signal, and couple the output of display processor 110 to the input of matrix 112 if the input signal is a digital signal. Matrices 112 and 114 operate in the conventionally known manner to provide RGB output signals in response to the input signals. By selecting the appropriate one of the matrices 112 and 114, proper colorimetry processing is applied to the selected input signal to provide a display having uniform colorimetry regardless of the selected input signal.

Switch 126 couples the output of the selected matrix with the input of display controller 116. Display controller 116 generally includes circuitry for controlling the output image in response to user input controls, such as brightness and contrast. The output of display controller 116 is then coupled to a display device 120, which may include a CRT, a flat panel display, or the like.

In apparatus 100, an OSD signal is coupled to display processor 110 prior to matrices 112 and 114, which convert the input signals to RGB format for display. This is in contrast with prior art devices, wherein the OSD signal is combined with the video program signal in a mixer disposed downstream of display controller 116.

However, apparatus 100 does not match the colorimetry of the OSD signals in response to the selected signal source. This may lead to undesired changes in the colors of the OSD depending on the selected signal source. In other words, the OSD colors will change as the colorimetry compensation is changed. To avoid such changes, it is desirable to modify the OSD colors to complement the compensation provided to the video program signal.

Figure 2:
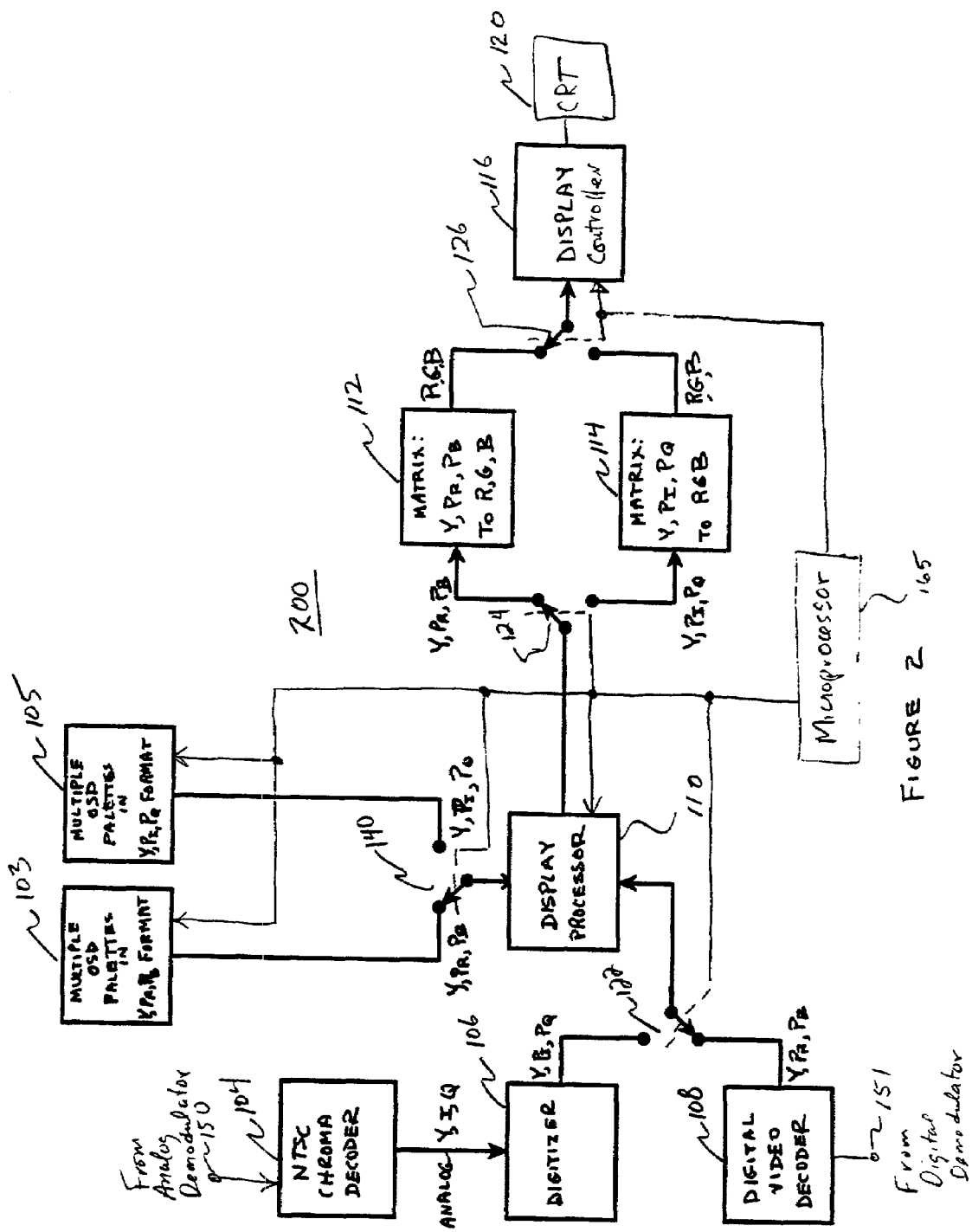
FIG. 2 illustrates a block diagram of an OSD system wherein the OSD signal is coupled to the video program signal in a manner to provide uniform colorimetry regardless of the signal source.

FIG. 2 illustrates a second embodiment of the present invention, wherein OSD colors are modified to complement the colorimetry processing applied to the combined video signal. Apparatus 200 includes OSD palettes 103 and 105, wherein OSD palette 103 provides output signals in the Y, $P_R$, $P_B$ format, and OSD palette 105 provides output signals in the Y, $P_I$, $P_Q$ format. In operation, OSD palette 105 is coupled to display processor 110 when an analog input signal is selected via signal source 150 and OSD palette 103 is coupled to display processor 110 when a digital input signal is selected via signal source 151. The desired one of palettes and 103 and 105 is selected by switch 140, which is controlled by microprocessor 165.

When apparatus 200 receives an analog signal via source 150, switch 122 is coupled to the output of digitizer 106, switch 140 is coupled to the output of OSD palette 105, switch 124 is coupled to matrix 114, and switch 126 is coupled to matrix 114. In this manner, the input signal and the OSD signal are both in the Y, $P_I$, $P_Q$ format and the colorimetries match.

Similarly, when apparatus 200 receives a digital signal via source 151, switch 122 is coupled to the output of digital video decoder 108, switch 140 is coupled to the output of OSD palette 103, switch 124 is coupled to matrix 112, and switch 126 is coupled to matrix 112. Here, the input signal and the OSD signal are both in the Y, $P_R$, $P_B$ format and the colorimetries again match. As a result, the colors of the OSD remain uniform regardless of whether the input signal is from signal source 150 or 151.

Figure 3:
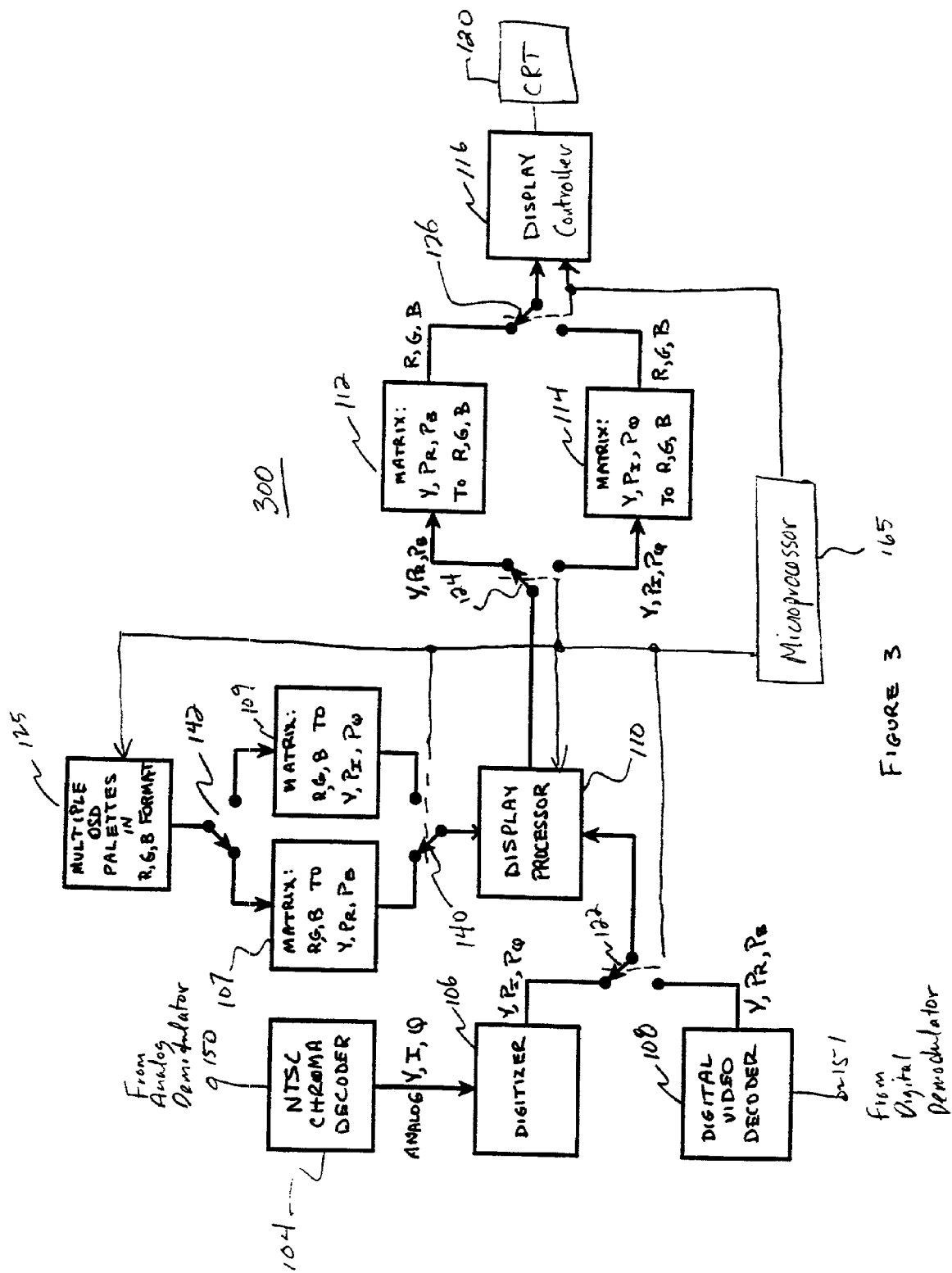
FIG. 3 illustrates a block diagram of a another embodiment of an OSD system wherein the OSD signal is coupled to the video program signal in a manner to provide uniform colorimetry regardless of the signal source.

FIG. 3 illustrates another embodiment of the present invention, wherein OSD colors are modified to complement the colorimetry compensation applied to the video program signal. In apparatus 300, OSD palette 125 is coupled to display processor 110 via either matrix 107 or matrix 109. In this case, OSD palette 125 stores the OSD information in RGB format. Matrix 107 operates on the OSD signals from OSD palette 125 to provide Y, $P_R$, $P_B$ formatted signals. Matrix 109 operates on the OSD signals to provide Y, $P_I$, $P_Q$ formatted signals. The outputs of matrices 107 and 109 are coupled to display processor 110 via switch 140, which is controlled by microprocessor 165.

When source 150 is selected, thereby providing Y, $P_I$, $P_Q$ signals to display processor 110, switch 122 is coupled to the output of digitizer 106, switch 142 is coupled to the input of matrix 109, switch 140 is coupled to the output of matrix 109, switch 124 is coupled to matrix 114, and switch 126 is coupled to matrix 114. In this manner, the input signal and the OSD signal are both in the Y, $P_I$, $P_Q$ format and the colorimetries match.

Similarly, when source 151 is selected, thereby providing Y, $P_R$, $P_B$ signals to display processor 110, switch 122 is coupled to the output of digital video decoder 108, switch 142 is coupled to matrix 107, switch 140 is coupled to matrix 107, switch 124 is coupled to matrix 112, and switch 126 is coupled to matrix 112. Here, the video signal and the OSD signal are both in the Y, $P_R$, $P_B$ format and the colorimetries again match. As the colorimetry of the OSD signal match the colorimetry of the input video signal regardless of the signal source, the colors of the OSD on the output image remain uniform regardless of whether the input signal is an analog signal or a digital signal.

It will be apparent to those skilled in the art that although the present invention has been described in terms of various exemplary embodiments, modifications and changes may be made to the disclosed embodiment without departing from the essence of the invention. For example, those skilled in the are will realize that various elements for operating on the video or OSD signals, as well as the switches for coupling the signals from one element to another may be implemented in either hardware or software form using conventionally known techniques. Therefore, it is to be understood that the present invention is intended to cover all modifications as would fall within the true scope and spirit of the present invention.

The invention claimed is:

1. A video signal processing apparatus, comprising:
   a first video signal source for providing a first video signal representative of a first video program and formatted according to a first color format;
   a second video signal source for providing a second video signal representative of a second video program and formatted according to a second color format;
   switch means that selects one of the first and second video signal sources and provides a selected video signal for processing;
   means for generating an On Screen Display (OSD) signal for forming a graphics display that is overlaid onto one of the first and second video programs, the generating means capable of providing the OSD signal in any one of the first and second color formats, wherein the generated OSD signal is formatted in accordance with a selected one of the first and second color format that corresponds to a color format associated with the selected video signal, the generating means comprising
   a color palette that includes color information formatted in accordance with a predetermined color format, and
   a plurality of color conversion matrices for converting the color information in the color palette to provide the OSD signal, which is formatted in accordance with the selected one of the first and second color format; and
   means, operatively coupled to the OSD generating means and the first and second video signal sources, for combining the OSD signal generated by the OSD generating means with the selected one of the first or second video signals.

2. The apparatus of claim 1, wherein the color palette comprises color information formatted in the RGB format.

3. The apparatus of claim 1, wherein the plurality of conversion matrices includes a conversion matrix for converting the color information in the color palette into Y, $P_R$, $P_B$ format, and a conversion matrix for converting the color information in the color palette into Y, $P_I$, $P_Q$ format.

4. The apparatus of claim 1, wherein the first video signal is an analog television signal.

5. The apparatus of claim 1, wherein the second video signal is a digital television signal.

6. A method of producing graphics having a color format that matches the color format of a received signal, the method comprising the steps of:
   selecting a video signal source from a plurality of video signal sources to provide a selected video signal, the video being representative of a video program and formatted in accordance with one of a first color signal format and a second color signal format;
   providing a color palette that includes color information formatted in accordance with a predetermined color format;
   providing a plurality of color conversion matrices, wherein each color conversion matrix is adapted to convert the color information in the color palette to provide a graphics signal that is formatted in accordance with a particular color format, wherein said plurality of color conversion matrices enables providing graphics signals in any one of the first and second color formats;
   selecting a desired one of the plurality of color conversion matrices that corresponds to the selected video signal source and generating a graphics signal for forming a graphics display that is overlaid onto the video programs, the graphics signal being formatted in accordance with one of the first color signal format and the second color signal format that corresponds to a color format associated with the selected video signal;
   combining the graphics signal with the received signal; and
   processing the combined signal to generate an output signal.

7. The method of claim 6, wherein the color palette comprises color information formatted in the RGB format.

8. The method of claim 6, wherein the color conversion matrices convert the color information in the color palette into one of a Y, $P_R$, $P_B$ formatted signal and Y, $P_I$, $P_Q$ formatted signal.

* * * * *